(12) United States Patent
Van de Velde et al.

(10) Patent No.: US 8,157,442 B2
(45) Date of Patent: Apr. 17, 2012

(54) RADIOMETRIC THERMOMETER

(75) Inventors: Jean-Claude Van de Velde, Lambersart (FR); Eugène Constant, Villeneuve d'Ascq (FR); Sylvain Jonniau, Roubaix (FR); Roger Ringot, Neuve-chapelle (FR)

(73) Assignee: Universite des Sciences Et Technologies de Lille, Villeneuve d'Ascq (FR)

( * ) Notice: Subject to any disclaimer, the term of this patent is extended or adjusted under 35 U.S.C. 154(b) by 379 days.

(21) Appl. No.: 12/594,786

(22) PCT Filed: Apr. 11, 2008

(86) PCT No.: PCT/FR2008/000504
§ 371 (c)(1),
(2), (4) Date: Oct. 5, 2009

(87) PCT Pub. No.: WO2008/142283
PCT Pub. Date: Nov. 27, 2008

(65) Prior Publication Data
US 2010/0061421 A1    Mar. 11, 2010

(30) Foreign Application Priority Data

Apr. 12, 2007  (EP) .................................... 07370007

(51) Int. Cl.
*G01K 7/00*    (2006.01)

(52) U.S. Cl. ........................................ 374/173; 374/172
(58) Field of Classification Search .................. 374/172, 374/173, 121; 327/512, 513; 702/99
See application file for complete search history.

(56) References Cited

U.S. PATENT DOCUMENTS 4,568,200 A * 2/1986 Hatono et al. ................. 374/122
5,176,146 A * 1/1993 Chive et al. .................... 600/549

FOREIGN PATENT DOCUMENTS
JP       56-108947       8/1981
* cited by examiner

*Primary Examiner* — Lisa Caputo
*Assistant Examiner* — Roger Hernandez-Prewitt
(74) *Attorney, Agent, or Firm* — Harness, Dickey & Pierce, P.L.C.

(57) ABSTRACT

The radiometric thermometer includes a microwave sensor and electronic means for processing the electrical signal delivered by the sensor. The electronic means includes means for preamplifying the electrical signal delivered by the microwave sensor; variable-gain amplification means with automatic gain control, which means amplify the signal delivered by the preamplification means, the amplification means having an automatic gain control signal that allows the gain to be automatically adjusted on the basis of the signal output by the amplification means, and electronic temperature measurement means for measuring temperature on the basis of the automatic gain control signal.

16 Claims, 4 Drawing Sheets

RADIOMETRIC THERMOMETER

CROSS-REFERENCE TO RELATED APPLICATIONS

This application is a 371 U.S. National Stage of International Application No. PCT/FR2008/000504, filed Apr. 11, 2008, which claims priority to European Patent Application No. EP 07370007.2, filed Apr. 12, 2007. The disclosures of the above applications are incorporated herein by reference.

FIELD OF THE INVENTION

The present invention relates to the measurement of the temperature of a body by detecting the radiation emitted by said body, by means of a new radiometric thermometer. It is preferably, though not exclusively, applied in a non-invasive manner for measuring the temperature of biological tissues, and in particular for measuring the temperature of a human body.

PRIOR ART

To this day, various types of radiometers are known, which are used to measure from a distance the temperature of a region, and for instance the mean temperature of biological tissues of a human body, by detecting the power of the thermal noise emitted by this region. These radiometric thermometers include a hyperfrequency or microwave sensor (generally within the 0.5 to 20 GHz range), such as for instance an antenna or a probe.

This sensor, referred to as a "microwave sensor" in the present document, delivers a signal output, the power of which is a function of said temperature. This signal output is processed by electronic means that generally include a power detector functioning in its quadratic zone, in order to deliver an electrical quantity directly proportional to the power of the signal, and thus to the temperature.

The mean sensitivity of such a power detector is in the best-case scenario −60 dBM, which in practice requires a very high amplification to be implemented (in practice an amplification of at least 80 dB). This results in significant oscillation risks, and this type of technical solution implies high manufacturing costs, which make it incompatible for mass application.

OBJECT OF THE INVENTION

The present invention aims to propose a new radiometric thermometer with a low manufacturing cost, which as a result is adapted to mass applications.

SUMMARY OF THE INVENTION

The radiometric thermometer of the invention includes a microwave sensor and electronic means for processing the electrical signal delivered by said sensor. Said electronic means include:
  means for pre-amplifying the electrical signal delivered by the microwave sensor,
  variable-gain amplification means with automatic gain control, which allow the amplification of the signal delivered by the pre-amplification means, said amplification means having an automatic gain command signal that allows the gain to be automatically adjusted on the basis of the signal output by the amplification means, and
  electronic temperature measurement means for allowing temperature to be measured on the basis of said automatic gain command signal.

The gain of the pre-amplification means of the radiometric thermometer of the invention is sufficiently high for the power of the signal input of the variable-gain amplification means to always be too significant and to systematically make the automatic gain control react by decreasing the gain of the variable-gain amplification means. Thus, when electromagnetic radiation is detected by the microwave sensor, the automatic gain command signal varies so as to adjust automatically the gain of the variable-gain amplification means. The invention rests on the new finding that this variation of the automatic gain command signal is, in a first approximation, proportional to the variation of the power of the signal delivered by the microwave sensor, and as a result can be advantageously used for measuring the temperature of the body or the region having emitted the radiation.

More particularly, and in an optional manner according to the invention, the radiometric thermometer of the invention implements the additional and optional characteristic features of claims 2 to 15, taken in isolation or in combination with one another.

The characteristic features of claims 3 to 9 and the characteristic features of claim 15 can also advantageously be implemented in any type of known thermal radiometer, independently of the main technical characteristic features of claim 1, and in this case are not used in combination with the implementation of an automatic gain control and the use of the automatic gain command signal for measuring temperature.

The invention also has as its object the use of the radiometric thermometer cited above, to measure in a non-invasive manner the temperature of biological tissues, and in particular the temperature of a human body.

A further object of the invention constitutes a thermal noise source with a low thermal inertia, intended to be implemented in a radiometric thermometer, regardless of the structure of this radiometric thermometer, and including the one and/or the other characteristic features of claims 3 to 9 or of claim 15.

BRIEF DESCRIPTION OF THE DRAWINGS

Other characteristic features and advantages of the invention will become clearer on reading the detailed description that follows of several preferred embodiments of the invention, said description being given as a non-limiting and non-exhaustive example of the invention, and with reference to the attached drawings, in which.

DETAILED DESCRIPTION

Figure 1:
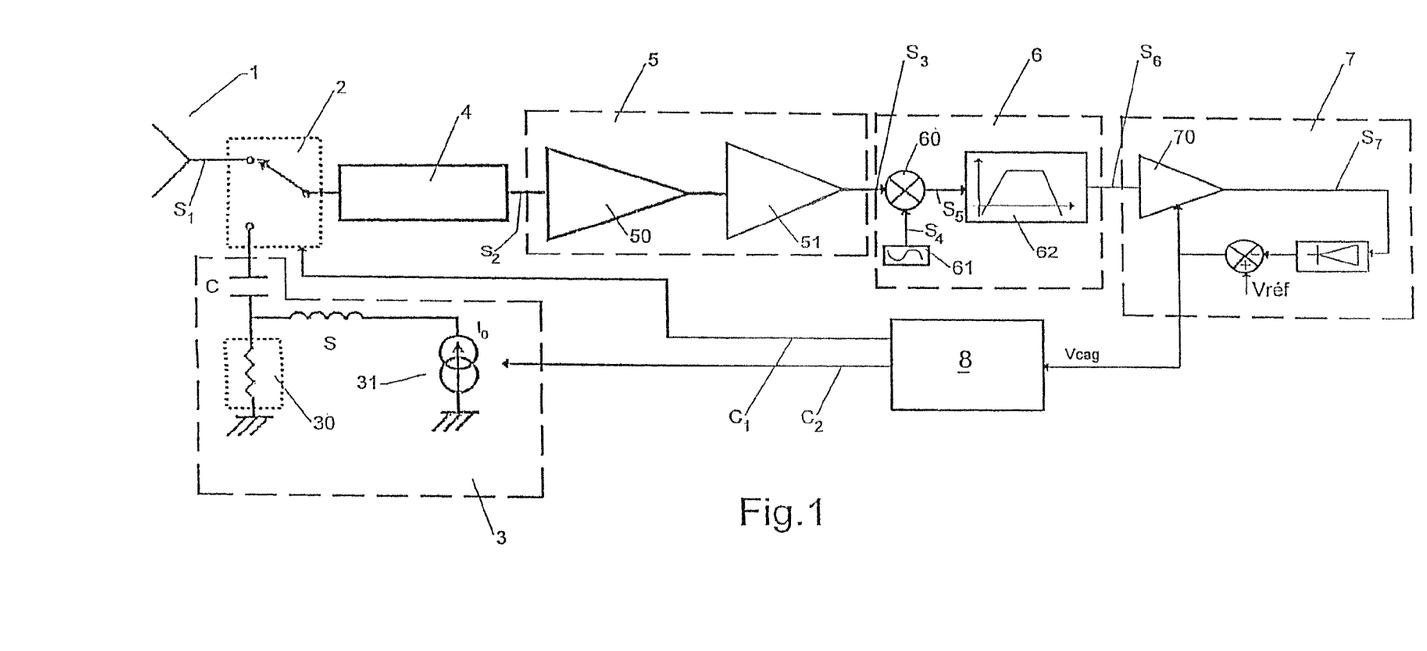
FIG. 1 is a block diagram of a first embodiment of a radiometric thermometer of the invention.

With reference to FIG. 1, an example of a radiometric thermometer according to the invention has been shown, enabling the measurement, in a non-invasive manner, of the mean temperature of a body, from the electromagnetic microwave radiation emitted by said body.

Structure of the Radiometric Thermometer

This radiometric thermometer includes an antenna 1 enabling said electromagnetic microwave radiation to be recorded. This antenna 1 could also be replaced by a probe. The antenna 1 delivers an electric signal output S1, the power P of which is a function of the temperature of the body having emitted the electromagnetic radiation recorded by the antenna.

This signal output S1 is processed by electronic means, which are specific to the invention, and an embodiment of which will be outlined in more detail hereafter with reference to FIG. 1.

These electronic means include:
- a Gaussian white thermal noise source 3,
- a unidirectional line 4,
- a switch 2 with two positions enabling the unidirectional line 4 to be connected either to the output of the antenna 1 or to the thermal noise source 3,
- means 5 for pre-amplifying the electrical signal S2 passing through the unidirectional line 4,
- superheterodyne-type means 6, enabling a transposition of the frequencies of the pre-amplified signal S3 and delivering a signal S6,
- variable-gain amplification means 7 with automatic gain control, for the amplification of the signal S6,
- an electronic processing and control unit 8, which enables an automatic measuring of temperature to be carried out from the continuous automatic gain command signal (Vcag) of the amplification means 7, and which delivers two electrical command signal outputs C1 and C2.

The coupling of the antenna 1 with the body under investigation, the temperature measurement of which is sought, can be carried out directly by contact with the constitutive material of said body, in order to better avoid parasitic radiation. As a result, the antenna 1 can be of the "strip-slot" type and its dimensions are optimised not only in accordance with the frequency of work, but also as a function of the nature of the material under investigation (homogenous or stratified) in a manner such as to make the antenna-material reflection coefficient as weak as possible. The antenna 1 is preferably made out of a material with low dielectric losses (for instance FR4 type epoxy glass, Kapton), in order to minimise the incidence of the physical temperature of the antenna. In addition, its thermal mass is preferably as low as possible in order to minimise the thermal antenna-material gradient, and the time of thermal equilibrium of the antenna-body under investigation.

The coupling of the antenna 1 to the body under investigation can also be carried out without contact. This requires the measurement to be carried out within a closed metallic enclosure with an antenna adapted to the free space.

The switch 2 is controlled by the electronic unit 8 by means of the command signal C1, and can be achieved, equally according to the invention, with either active components (FETs, PIN diodes) or passive components such as electromechanical microsystems. An SP2T microwave switch is preferably used, such that the switch strictly records the same charge during the phases 1 and 2 described below, which contributes to diminishing the risks of error brought about by the variations of adaptation, as well as the errors brought about by variations in the coefficient of transmission.

The thermal noise source 3 includes mainly a resistive load 30 with a low thermal inertia, associated with a current generator 31, which is controlled by the electronic unit 8 by means of the command signal C2. In order to provide good insulation for the microwave part of the continuum when the current source 31 supplies the load 30, the coupling of the thermal noise source 3 to the switch is realised with the help of a polarisation T constituted by a coil S and a capacity C.

The control of the switch 2 and of the thermal noise source 3 by the electronic unit 8, as well as a preferred embodiment of the load 30 shall be described in more detail hereinafter.

In the particular embodiment of FIG. 1, the pre-amplification means 5 include two low-noise cascade amplifiers 50, 51. This is not limiting to the invention. In a further embodiment, these pre-amplification means 5 could include a single low-noise amplifier or more than two low-noise cascade amplifiers.

The transposition of the frequencies of the signal output S3 delivered by the pre-amplification means 5, towards intermediary frequencies that are lower and advantageously easier to process, is obtained by carrying out, by means of a mixer 60, the product of this signal S3 with a sinusoidal signal S4 of a predefined fixed frequency F delivered by a local phase-locked oscillator 61 (PLL typically). A signal S6 of lower intermediary frequencies (FI) is obtained after the filtering of the signal S5 at the output of the mixer 60, by means of a band-pass filter 62 of the predefined bandwidth $\Delta F$.

The choice of the frequency F depends on the intended application of the radiometric thermometer, and in particular on the permittivity of the material, the temperature measurement of which is sought, and on the material depth of investigation sought for the temperature measurement. It will thus be judiciously set by a person skilled in the art on a case-by-case basis according to the intended application.

As an example, a frequency F of around 1.575 GHz is a good compromise for measuring the temperature of biological tissues of a human body at an investigation depth amounting to 2 cm.

The power P of the signal output S6 at the output of the band-pass filter 62 is linked to the temperature of the body that has emitted the electromagnetic radiation by the following relation:

$$P = k \cdot T \cdot \Delta F \quad (1)$$

with:
k: Boltzmann Constant,
$\Delta F$: bandwidth of the filter 62

In order to avoid perturbation of the temperature measurement by other parasitic frequencies, the bandwidth $\Delta F$ of the filter 62 must preferably be as low as possible. A bandwidth of 2 Mhz for instance may be chosen (for instance: low frequency of the filter 62 equal to 4 MHz; high frequency of the filter 62 equal to 6 MHz).

The variable-gain amplification means 7 with automatic gain control include a variable-gain (G2) amplifier 70 presenting a high gain dynamic (for instance of around 60 dB). This amplifier 70 is preferably a variable-gain logarithmic amplifier.

The gain G2 of this amplifier is automatically adjusted by a continuous automatic gain command signal (Vcag), which is obtained in a manner known as such from the signal output 37 of the amplifier 70 and from a reference voltage (Vref). This automatic gain regulation enables the level of signal S7, fixed by the reference Vref and independent of the level of the signal S6 applied at its input, to be maintained at the output of the amplification chain.

To be able to realise at low cost the chain of electronic processing constituted by the second low-noise amplifier 51, the frequency transposition means 6 and the variable-gain amplification means 7 with automatic gain control, it is advantageous to use a standard market component, such as the GPS component marketed by the company MAXIM INTEGRATED PRODUCTS, under the reference "MAX2745".

The gain G1 of the pre-amplification means 5 at the aforementioned frequency F is fixed at a sufficiently high value so that a minimum temperature variation that one wishes to detect (for instance $\Delta T$ equal to 1° C.) manifests itself as a variation of the power of the signal input S6 making the automatic gain control react (automatic decrease of the gain G2 for maintaining the signal S7 at a level fixed by the reference Vref).

In these conditions, the automatic gain command signal Vcag is in a first approximation proportional to the power of the signal witnessed by the antenna 1, and as a result to the temperature Tx of the body that has emitted the electromagnetic radiation recorded by the antenna 1. This automatic gain command signal (Vcag) can thus be used advantageously for measuring the temperature of the body that has emitted the electromagnetic radiation recorded by the antenna 1.

In the embodiment of FIG. 1, this signal processing (Vcag) for measuring the temperature is ensured by the electronic unit 8.

This electronic processing and control unit 8 is preferably a programmed electronic unit, including for instance a microprocessor or a microcontroller capable of executing a temperature-measuring programme loaded in a memory. It can nevertheless also be realised by means of a specific electronic circuit of the ASIC, FPGA type, etc.

Regardless of its architecture, this electronic processing and control unit 8 is designed to carry out a temperature measurement, by generating the command signals C1 and C2 of the switch 2 and of the current generator 3, according to a predefined sequence including the three successive phases described hereafter.

Phase 0:

The electronic unit 8 controls the switch 2 by means of the signal output C1 so as to connect the output of the antenna 1 used to capture the electromagnetic radiation emitted by the body under investigation to the unidirectional line 4 of the radiometric thermometer.

As explained previously, the automatic gain command signal Vcag is proportional to the temperature Tx of the body under investigation, emitting the electromagnetic radiation captured by the antenna. This signal Vcag resembles a Gaussian white noise with a mean non-null value, proportional to Tx, and of a given standard deviation.

This signal Vcag is sampled by the electronic unit 8 at a predefined sampling frequency Fe (for instance 1 kHz) during a predefined duration t0 (duration of phase 0), and is subsequently numerically converted and saved in the memory with a view to being processed later. The numerical values of this signal Vcag during the phase 0 will be referred to as $V_{x,i}$.

Phase 1:

The electronic unit 8 controls the switch 2 by means of the signal C1, so as to make it switch over into the other position, i.e. so that the unidirectional line 4 of the radiometric thermometer is now connected to the load 30 brought up to a temperature T1, which results in a signal Vcag being generated.

This temperature T1 is known and measured with the help of an electronic temperature sensor situated as close as possible to the resistor 30, to the unidirectional line 4 and to the switch 2, in order to minimise the temperature gradients between these components.

The signal Vcag during this phase 2 resembles a Gaussian white noise with a mean non-null value, proportional to the temperature T1, and of a given standard deviation.

This signal is sampled at the frequency Fe during a predefined duration t1 (duration of phase 1), and is subsequently numerically converted and saved in the memory with a view to being processed later. The numerical values of this signal Vcag during the phase 1 will be referred to as $V_{1,i}$.

Phase 2:

During this entire phase, the electronic unit 8 controls the current generator 31 by means of the command signal C1. The result is that this generator 31 supplies the load 30 with a continuous current of a constant intensity I0, which enables the load 30 to dissipate a constant electrical power and to bring it to a temperature T2=T1+$\Delta T$.

The temperature variation $\Delta T$ is known and depends on the intrinsic characteristic features of the load 30 and the intensity I0 of the current. For instance, when the load 30 is constituted by a resistance value R1 realised on a substrate, the temperature variation $\Delta T$ is given by the following relation:

$$\Delta T = Rth \cdot R1 \cdot I0^2 \quad (2)$$

Rth: thermal resistance of the substrate on which the resistance is realised
I0: intensity of the current in mA The resistive load 30 is dimensioned for a current of a given intensity I0 so that the temperature difference $\Delta T$ between the reference temperatures T1 and T2 is superior to a predefined minimum value, which depends on the application intended for the radiometric thermometer.

During phase 2, as previously, a signal Vcag is obtained that resembles a Gaussian white noise with a mean non-null value, proportional to the temperature T2, and of a given standard deviation. This signal is sampled at the frequency Fe during a predefined duration t2 (duration of phase 3), and is subsequently numerically converted and saved in the memory with a view to being processed later. The numerical values of this signal Vcag during the phase 2 will be referred to as $V_{2,i}$.

Temperature Calculation

At the close of the three above-cited phases, the electronic unit 8 calculates in a first instance:
a value VX from the $V_{x,i}$ samples,
a value V1 from the $V_{1,i}$ samples,
a value V2 from the $V_{2,i}$ samples,
and then in a second instance calculates the temperature Tx of the body under investigation by using the following formula:

$$Tx = T1 + \Delta T \cdot (VX - V1)/(VX - V2) \quad (3)$$

For the application of this formula (3), the measurements during the above-cited phases 0, 1 and 2 are considered to have been made sufficiently quickly so that between each of the phases 0 to 2, the gain of the electronic processing chain can be considered not to have moved.

The calculation of the values VX, V1 and V2 consists for instance in the calculation of the mean value of the numerical samples ($V_{x,i}$, $V_{1,i}$, $V_{2,i}$) by simple numerical integration. Other methods for calculating VX, V1 and V2 from numerical samples $V_{x,i}$, $V_{1,i}$, $V_{2,i}$ can be considered by the person skilled in the art.

Preferably, in order to obtain a better estimation of each of the quantities VX, V1, V2 by reducing their standard deviation as much as possible, the phases 0 to 2 and the calculation of Tx by means of the formula (3) are successively repeated N times, which enables a more precise mean value of TX to be obtained. For instance, with a sampling frequency Fe of 1 kHz, a number of samples acquired during each phase 0 to 2 equal to 50, and a number of iterations N of the phases 0 to 2 equal to 40, a mean temperature measurement Tx can be carried out approximately every 6 seconds.

Figure 2:
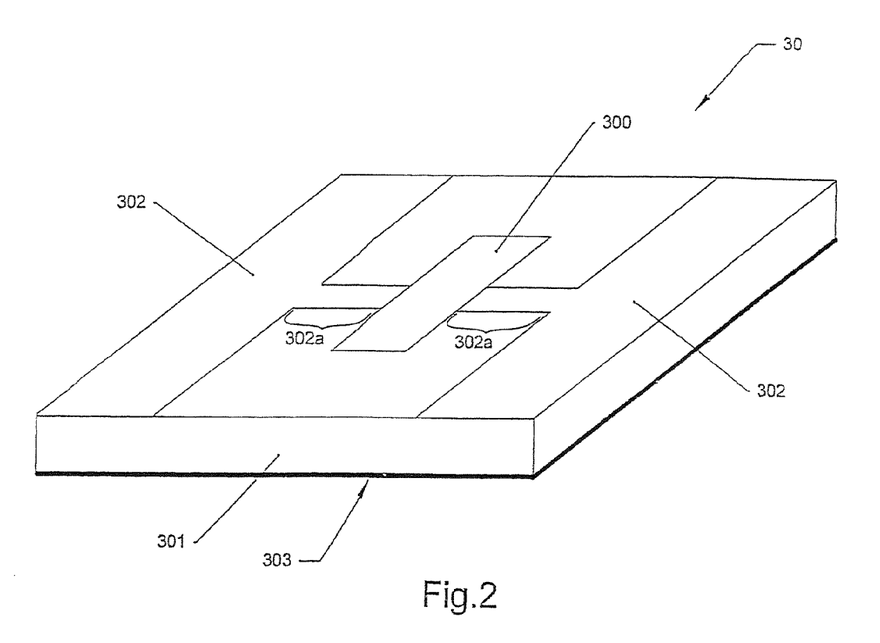
FIG. 2 is a perspective view of a resistive load with a low thermal inertia that can be advantageously implemented in a radiometric thermometer of the invention, to constitute a thermal noise source.

Embodiment of the load 30—FIG. 2

FIG. 2 shows a preferred embodiment of a resistive load 30 that can be used to realise the thermal noise source 3.

Generally speaking, and regardless of the structure of this load, the load 30 preferably presents a very low thermal inertia, which advantageously makes it possible to obtain rapid temperature increase times (in order to achieve temperature T2 when the current source 31 supplies the load 30) and rapid temperature decrease times (in order to achieve temperature T1 when the current source 31 no longer supplies the load 30). It is important that these temperature increase and times and temperature decrease times be short, in order to reduce the transitory periods between each above-mentioned phase 0 to 2. This also enables the electrical consumption of the source 31 to be advantageously reduced.

Preferably, the thermal inertia of the resistive load 30 is sufficiently weak for the temperature increase or decrease times of the thermal noise source between the two reference temperatures T1 and T2 to be less than 50 ms and preferably less than 25 ms.

The choice of reference temperatures T1 and T2 depends on the application intended for the radiometric thermometer. Preferably, but not necessarily, in order to reduce the temperature Tx measuring errors, the person skilled in the art will fix the reference temperatures T1 and T2 in such a manner that the measured temperature Tx is comprised between T1 and T2. In a non-limiting manner of the invention, when the radiometric thermometer is designed to measure the body temperature of a human body, T1 will for instance be fixed at approximately 10° C. and T2 at approximately 50° C., i.e. a temperature difference $\Delta T$ ($\Delta T=T2-T1$) amounting to around 40° C.

With reference to FIG. 2, in a preferred embodiment, the resistive load 30 includes a resistance 300 realised in the form of a layer of NiCr, which is deposited on the upper surface of a glass substrate 301. On the lower surface of the substrate 301, a metallisation layer 303, for instance in gold, is also deposited.

For the electrical connection of the resistance 300, metallisation contacts 302, for instance in gold, are realised via a deposit on the upper surface of the substrate 301. The continuous ports 302a of these contacts 302 are designed so as to increase the thermal resistance of the liaison with the resistance 300, which avoids the creation of heat sinks and enables the electrical power to be dissipated only within the resistance 300.

In a non-limiting example of the invention, the resistance 300 presented a sheet resistance of approximately 100 ohms. The current source 31 was designed to deliver a current of an intensity I0 equal to 15 mA. The temperature increase or temperature decrease times of the resistive load 30 equalled approximately 20 ms, for a temperature difference $\Delta T$ ($\Delta T=T2-T1$) of around 40° C.

Figure 3:
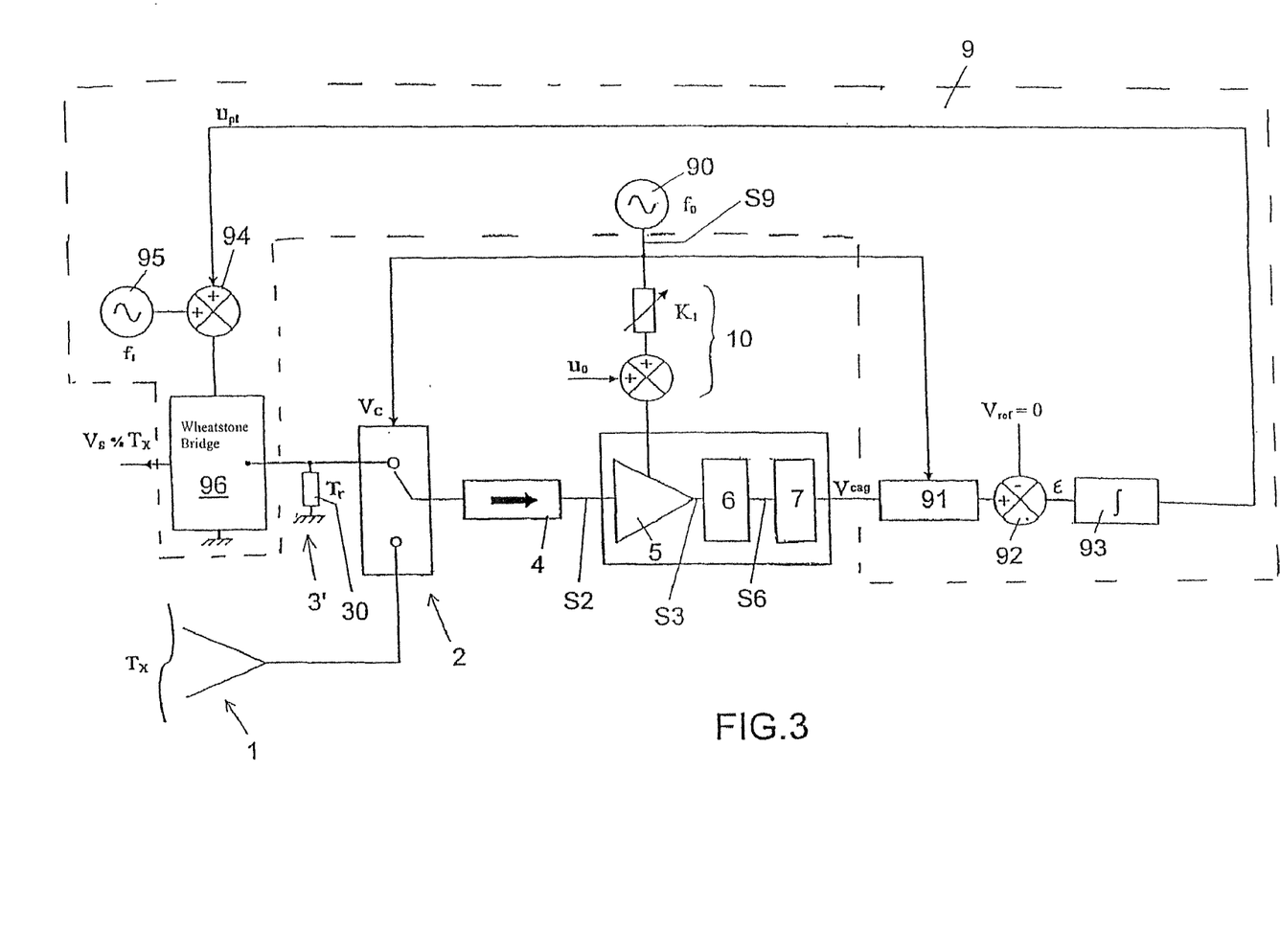
FIG. 3 is a block diagram of a second embodiment of a radiometric thermometer of the invention.

FIG. 3 shows a further embodiment of a radiometric thermometer of the invention. In this embodiment, and in an identical manner to that described in FIG. 1, we see again the implementation of an antenna 1, a switch 2 with two positions, a unidirectional line 4 (insulator), pre-amplification means 5 of the signal S2 passing via the unidirectional line 4, superheterodyne-type means 6, enabling a transposition of frequencies of the pre-amplified signal S3 and delivering a signal S6, and variable-gain amplification means 7 with automatic gain control, for the amplification of the signal S6. These means 1, 2, 4, 5, 6 and 7 are identical to those of FIG. 1. In a further embodiment, the means 6 for transposing the superheterodyne-type frequencies could be eliminated.

In this embodiment, the radiometric thermometer also includes a thermal noise source 3', which is different to that of FIG. 1, and the means 9 for measuring the temperature Tx from the automatic gain command signal Vcag are different from the means 8 implemented for the embodiment of FIG. 1.

In this embodiment of FIG. 3, the measuring means 9 include a low-frequency generator 90, which delivers a command signal S9 of a frequency $f_0$, and which controls the switch 2 by means of this signal. The switch 2 thus connects to the rhythm of the frequency $f_0$, alternately with the antenna 1 and with the thermal noise source 3'. This thermal noise source 3' includes a resistive load 30 of an ohmic value $R_{PT}$, for instance 50 ohms.

In a first approximation and by using an antenna 1 adapted to the body under investigation, the amplitude of the signal Vcag is:

$$Vcag = g(Tx - Tr) \quad (4)$$

in which g is the gain of the amplification chain of the signal delivered by the antenna.

The frequency $f_0$ is chosen in a manner to be free of the noise in 1/f of the pre-amplification means 5. It is enough for the choice of this frequency $f_o$ to be above the "flicker noise", which for instance is situated at approximately the kHz level when the material used for realising the pre-amplification means 5 is silicon.

In an embodiment of FIG. 3, and in contrast to the functioning of the embodiment of FIG. 1 previously described, the attempt is made to obtain a zero automatic gain command signal Vcag (Vcag=0), which advantageously enables Tx=Tr (see equation (4)) to be obtained regardless of the fluctuations of the gain g.

To achieve this, the temperature Tr of the resistive load is acted upon, by applying to it a continuous voltage Upt, obtained from the automatic gain command signal Vcag. Thus, in this embodiment, the temperature Tr of the resistive load 30 serves as both a reference noise temperature as well as enabling the measurement of the temperature Tx of the body under investigation.

More particularly, the automatic gain command signal Vcag is detected in a manner that is synchronous to the frequency $f_0$ by means of the signal S9 (FIG. 3—synchronous detection means 91), before being compared to a zero reference voltage (Vréf=0) by means of a comparator 92. The error signal output $\epsilon$ of the comparator 92 is integrated by means of an integrating circuit 93. According to the circumstances, this integrating circuit 93 can be of a linear or a non-linear type.

The continuous voltage Upt applied to the resistive load 30 corresponds to the signal output of the integrating circuit 93, which results in the dissipation of a certain power P by the resistive load 30, and thus, through its thermal resistance Rth, its temperature Tr of $\delta T$ is increased, i.e.:

$$Tr = T0 + \delta T \quad (5)$$

$$\delta T = Rth \cdot P \quad (6)$$

$$P = Rth \cdot \frac{(Upt)^2}{Rpt} \quad (7)$$

When the linear integrating circuit 93 is used, the time constant $\tau$ of this integrating circuit is constituted by a resistance R and a fixed capacitor C. The choice of this time constant depends on the desired precision of the measurement. During a temperature measurement, it is preferable to wait for a duration equal to at least 4 τ, in order to obtain the final value of the temperature measurement at 99%.

To measure the temperature Tr of the resistive load 30, the latter is placed in a Wheatstone bridge 96, which is supplied (adder 94) by both an alternating voltage Vp, at the frequency $f_1$, delivered by a generator 95, and by the continuous voltage Upt coming from the integrating circuit 93.

The alternating voltage Vp, at the frequency $f_1$, enables a synchronous detection of the disequilibrium of the Wheatstone bridge 96 and thus enables, at the output of the Wheatstone bridge 96, a voltage Vs to be obtained that is proportional to the temperature Tr of the resistive load 30. Knowing in addition that the continuous voltage Upt coming from the integrating circuit 93 enables the signal Vcag to be made zero, the voltage Vs at the output of the Wheatstone bridge 96 is proportional to the temperature Tx of the body under investigation (see equation (4)).

Preferably, but not necessarily, the thermometer includes a balancing means 10 between the antenna path and that of the reference (thermal noise source 3'). Indeed, when the antenna 1 is replaced by a resistive load of the same value and brought up to the same temperature as the resistive load 30, the signal Vcag must be zero. However, because the isolator 4 is not perfect, the noise factor of the pre-amplification means 5 varies according to whether the switch 2 is switched over onto the antenna path or onto the reference path. To compensate for this problem, the gain of these pre-amplification means 5 is acted upon by regulating their supply voltage $U_0$ through the addition of a fraction of the command signal S9 of the switch 2 via an adjustable resistance K1, of the potentiometer type.

Figure 4:
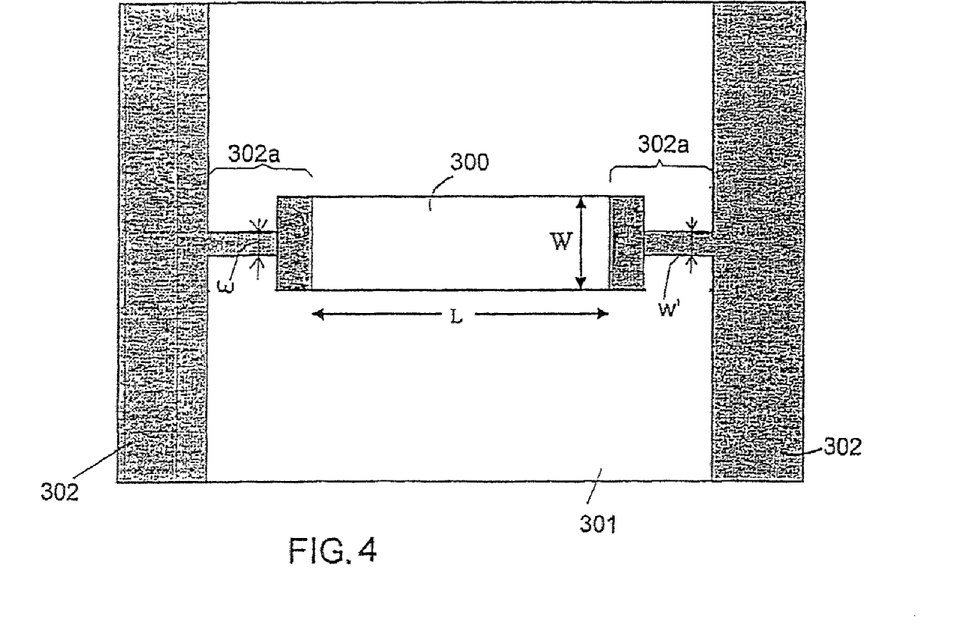
FIG. 4 is a view from above of a resistive load adapted for the second embodiment of FIG. 3.
Figure 5:
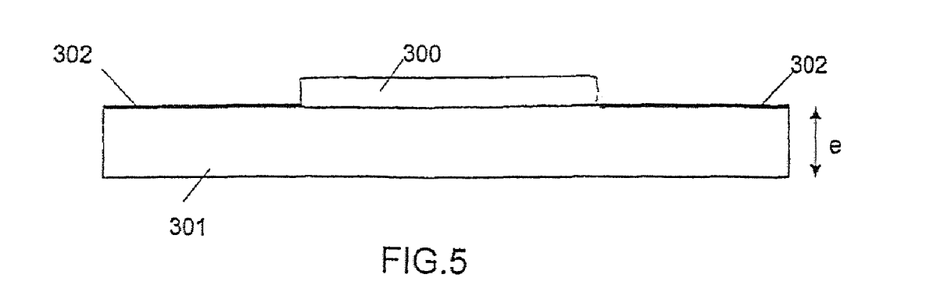
FIG. 5 is a side view of the resistive load of FIG. 4.

FIGS. 4 and 5 show a preferred embodiment of a resistive load 30 adapted to the embodiment of FIG. 3.

This resistive load 30 is constituted by a resistance 300 realised by depositing a fine layer of platinum (Pt) onto a substrate 301 of a thickness e. The dimensions L, W are determined in order to obtain the sought-after resistance value $R_{PT}$.

For the electrical connection of the resistance 300, metallisation contacts 302, for instance in gold, are realised by the deposit on the upper surface of the substrate 301. The continuous ports 302a in gold of these contacts 302 in contact with the resistance 300 are designed (low width W') in order to increase the thermal resistance of the connection and thus prevent the heat dissipated in the resistance 300 from escaping.

The material and thickness e of the substrate 301 are chosen in such a manner as to obtain a wide temperature variation of the resistance for a weak dissipated electrical power. For the substrate 301, a material with a low thermal conductivity is thus preferably used, for instance quartz.

The radiometric thermometer of the invention can be used in all the applications of non-invasive measurement of the temperature of a body, regardless of the structure and the material or materials constituting this body. For instance, and in a non-exhaustive and non-limiting manner of the invention, the radiometric thermometer can be used in the medical domain for a non-invasive measurement of the temperature of biological tissues, and in particular of the human body, or in the food-processing domain for a non-invasive measuring of the temperature of food products.

The invention claimed is:

1. A radiometric thermometer comprising a microwave sensor and electronic means for processing an electrical signal delivered by said sensor, wherein said electronic means comprises means for pre- amplifying the electrical signal delivered by the microwave sensor, variable-gain amplification means with automatic gain control, which allows the amplification of the signal delivered by the pre-amplification means, said amplification means comprising an automatic gain command signal that allows the gain to be automatically adjusted on the basis of the signal output by the amplification means, and electronic temperature measurement means for allowing temperature to be measured on the basis of said automatic gain command signal resulting from the microwave sensor signal.

2. The radiometric thermometer according to claim 1, wherein the variable-gain amplification means with automatic gain control comprises a logarithmic amplifier.

3. The radiometric thermometer according to claim 1, further comprising a thermal noise source that comprises a resistive load associated with a current generator, which is controlled by the electronic temperature measurement means and which is capable of supplying the resistive load with a current, and a switch, which is controlled by the electronic temperature measurement means and which enables the input of the pre-amplification means to be connected either to the output of the microwave sensor or to the thermal noise source, and wherein the electronic temperature measurement means is designed to control the current source in such a manner that the resistive load can be brought up to two different reference temperatures; a first reference temperature (T1) in the absence of a current in the resistive load, and a second reference temperature (T2) when the resistive load is supplied with the current delivered by the current source.

4. The radiometric thermometer according to claim 3, wherein the electronic temperature measurement means is designed to carry out a temperature measurement by implementing the following three successive phases:

Phase 0: control of the switch so as to connect the output of the microwave sensor to the input of the pre-amplification means, and sampling during a predefined duration t0 of the automatic gain command signal, Phase 1: control of the switch so as to connect the thermal noise source to the input of the pre-amplification means, and sampling during a predefined duration t1 of the automatic gain command signal, the current source not supplying the resistive load of the thermal noise source with a current, Phase 2: control of the current generator such that the latter supplies the resistive load of the thermal noise source with a continuous current of a constant intensity, and sampling during a predefined duration t2 of the automatic gain command signal.

5. The radiometric thermometer according to claim 4, wherein the electronic temperature measurement means is designed to calculate a value VX from the $V_{x,i}$ samples from the sampling of the first phase (phase 0), a value V1 from the $V_{1,i}$ samples from the sampling of the second phase (phase 1), and a value V2 from the $V_{2,i}$ samples from the sampling of the third phase (phase 2), and to calculate a temperature Tx from the values VX, V1 and V2, and from the first reference temperature T1 and from the second reference temperature T2 of the thermal noise source.

6. The radiometric thermometer according to claim 5, wherein the electronic temperature measurement means is designed to calculate a temperature Tx by means of the following formula: Tx=T1+(T2−T1)·(VX−V1)/(VX−V2).

7. The radiometric thermometer according to claim 5, wherein the electronic temperature measurement means is designed to repeat the three phases 0 to 2 several times and to calculate a mean temperature from the temperature values Tx calculated at each iteration.

8. The radiometric thermometer according to claim 3, wherein the resistive load of the thermal noise source comprises a resistance constituted by a layer of NiCr deposited on a glass substrate, and two metallisation contacts deposited on said substrate and in contact with said layer of NiCr.

9. The radiometric thermometer according to claim 3, wherein the temperature increase or decrease times of the thermal noise source between the two reference temperatures T1 and T2 is less than 50 ms and preferably less than 25 ms.

10. The radiometric thermometer according to claim 1, further comprising a thermal noise source and a switch that, at a predefined frequency, enables the input of the pre-amplification means to be connected either to the output of the microwave sensor or to the thermal noise source, and wherein the electronic temperature measurement means comprises control means enabling a temperature of the thermal noise source to be automatically adjusted on the basis of the automatic gain command signal, and means for measuring the temperature of the thermal noise source.

11. The radiometric thermometer according to claim 10, wherein the control means of the thermal noise source is capable of automatically adjusting the temperature of the thermal noise source so as to make the automatic gain command signal zero.

12. The radiometric thermometer according to claim 11, wherein the thermal noise source comprises a resistive load, and wherein the control means of the thermal noise source comprises a comparator, which supplies an error signal output from the automatic gain command signal, and an integrating circuit, which delivers a continuous voltage applied to the resistive load.

13. The radiometric thermometer according to claim 10, wherein the temperature measurement means for measuring the temperature of the thermal noise source comprises a Wheatstone bridge enabling an output voltage to be obtained that is proportional to the temperature of the thermal noise source.

14. The radiometric thermometer according to claim 10, further comprising a balancing means between the path corresponding to the output of the microwave sensor and the path corresponding to the thermal noise source.

15. The radiometric thermometer according to claim 10, wherein the thermal noise source comprises a resistive charge constituted by a platinum layer deposited onto a quartz-type substrate with a low thermal conductivity and two metallisation contacts deposited onto said substrate and in contact with said layer of platinum.

16. The radiometric thermometer according to claim 6, wherein the electronic temperature measurement means is designed to repeat the three phases 0 to 2 several times and to calculate a mean temperature from the temperature values Tx calculated at each iteration.

\* \* \* \* \*

UNITED STATES PATENT AND TRADEMARK OFFICE
CERTIFICATE OF CORRECTION

PATENT NO. : 8,157,442 B2
APPLICATION NO. : 12/594786
DATED : April 17, 2012
INVENTOR(S) : Jean-Claude Van de Velde et al.

It is certified that error appears in the above-identified patent and that said Letters Patent is hereby corrected as shown below:

Column 4, line 58, "37" should be --S7--.

Column 6, line 10, "intensity 10" should be --intensity I0--.

Column 6, lines 14-15, "intensity 10" should be --intensity I0--.

Signed and Sealed this
Twenty-sixth Day of June, 2012

David J. Kappos
*Director of the United States Patent and Trademark Office*